United States Patent [19]

Guzy

[11] 3,882,060

[45] May 6, 1975

[54] OIL RESISTANT RUBBER COMPOSITION

[75] Inventor: Raymond L. Guzy, Morton Grove, Ill.

[73] Assignee: Borg-Warner Corporation, Chicago, Ill.

[22] Filed: Nov. 14, 1973

[21] Appl. No.: 415,572

[52] U.S. Cl. ........ 260/37 AL; 166/242; 166/244 C; 260/79
[51] Int. Cl... C08g 51/04; C08g 51/08; E21b 17/14
[58] Field of Search ....... 260/2 A, 2 EP, 79, 37 AL; 166/244 C, 242

[56] References Cited
UNITED STATES PATENTS

| | | | |
|---|---|---|---|
| 3,388,105 | 6/1968 | Danielisz et al. | 260/2 EP |
| 3,414,529 | 12/1968 | Green et al. | 260/2 A |
| 3,425,961 | 2/1969 | Jellinek et al. | 260/2 EP |
| 3,503,910 | 3/1970 | Amberg et al. | 260/2 A |
| 3,598,765 | 8/1971 | Achon | 260/2 EP |
| 3,700,650 | 10/1972 | Hani et al. | 260/2 EP |
| 3,790,506 | 2/1974 | Tillson | 260/2 A |

OTHER PUBLICATIONS

Eitingon et al., –Chem. Abs. 67, 915205, (1967).
Insulation/Circuits Directory Encyclopedia, June/July 1970, pages 151–152, 160.
Hercules Chem. Co.,–Techn. Data Bulletin on Herchlor PRH–1, Series 3,5,8 & 9.
Cure System for Hydrin 100 Elastomers, (B. F. Goodrich).

*Primary Examiner*—Donald E. Czaja
*Assistant Examiner*—H. H. Fletcher
*Attorney, Agent, or Firm*—Richard J. Schlott

[57] ABSTRACT

A rubber composition containing epichlorohydrin homopolymer with various compounding ingredients which composition exhibits extraordinary physical and chemical properties under adverse conditions. The composition is compounded to withstand degradation where exposed to oil, water and brine at temperatures in excess of 250°F. and pressures as high as 4,000 pounds per square inch.

3 Claims, No Drawings

OIL RESISTANT RUBBER COMPOSITION

BACKGROUND OF THE INVENTION

Many rubber compositions have been provided for use in specialized areas, such as in contact with oil, water, salt water, etc. Many of these rubber compositions have exhibited sufficient stability and chemically resistant properties to make it possible to utilize the compositions for insulation of electrical cables, components in armored cables and the like. The oil industry has attempted to find a rubber compound that would not only be resistant to water, brine and oil, but one that would withstand those high pressures and high temperatures found at the bottom of an oil well. In some instances the pressure at the bottom of an oil well is as high as 4,000 psi and the temperature exceeds 250°F. Though some of the desired properties were prevalent in prior rubber compositions, some compositions that would withstand the high pressures and temperatures would tend to disintegrate in the presence of some of the oil and brine components found at the base of an oil well.

SUMMARY OF THE INVENTION

The instant invention provides a rubber composition having an epichlorohydrin homopolymer rubber base with certain compounding ingredients combined therewith which is capable of withstanding high temperatures and pressures and will maintain its structural integrity and useful physical properties upon exposure to oil, water and/or brine at temperatures up to and exceeding 250°F. and pressures as great as 4,000 psi. Materials closely related to the present invention are disclosed in our copending application Ser. No. 272,253, filed July 17, 1972, now U.S. Pat. No. 3,817,908. The instant invention employs a different curing system to produce improved environmental resistance.

The epichlorohydrin rubber used to prepare the present composition is a poly(alpha-chloro-propylene oxide) homopolymer such as is sold by Hercules Inc. under the trademark Herclor H. The epichlorohydrin rubber is preferably a high molecular weight polymeric material wherein the molecular weight exceeds 200,000.

The compounding ingredients used to prepare the rubber composition include a Group VIII metal dialkyldithiocarbamate, for example, nickel dibutyl dithiocarbamate; a basic heavy metal phosphite, for example, basic lead phosphite; phenothiazine; an aliphatic dicarboxylic acid, for example, azelaic acid, suberic acid, sebacic acid and the like; a Group IB or IIB metal dialkyldithiocarbamate, for example, copper dimethyl dithiocarbamate, zinc diethyl dithiocarbamate or cadmium diethyl dithiocarbamate, and imidazole. The aforementioned components are essential parts of the curing system for the rubber.

In the curing system, the amount of each component previously mentioned may be varied. For example, the Group VIII metal dialkyldithiocarbamate may be added in an amount of 1 to 2 parts by weight per 100 parts by weight of epichlorohydrin rubber. The basic heavy metal phosphite may vary from 5 to 20 parts (preferably 10–15 parts) per 100 parts by weight of the epichlorohydrin rubber. The phenothiazine may vary from 1 to 2 parts (preferably 1 part) per 100 parts by weight of the epichlorohydrin rubber and the dicarboxylic acid may be from 4 to 6 parts per 100 parts by weight rubber. The Group IB or IIB metal dialkyldithiocarbamate is added in very small amounts such as from 0.125 to about 0.2 parts per 100 parts by weight of rubber and the imidazole will vary from 1 to 2 parts per 100 parts by weight of rubber.

The rubber composition may also, of course, include processing aids and fillers. The processing aids that may be used without causing a detrimental effect on the rubber composition are sorbitan monoesters such as sorbitan monostearate, alkyl cellosolve esters and emulsions of ethylene waxes. In order to retain the highly beneficial effect of the rubber composition, it is preferable that the processing aids be added in relatively small amounts, such as 1 to 10 parts per 100 parts by weight of rubber.

Fillers that may be also used in the instant rubber composition include carbon black, diatomaceous earth, clays, silica, calcium carbonate and the like. The filler may be added in amounts from about 10 parts to about 50 parts per 100 parts by weight of rubber present and, of course, the specific amounts will vary depending on the desired or required mechanical properties of the end product. If the fillers are increased above 50% by weight of the rubber in the composition, the processing becomes exceedingly difficult. The preferred fillers are carbon black and silica.

Examples of specific formulations are set forth hereinbelow in TABLE I. All parts in TABLE I are by weight and the specific rubber compositions were made by compounding the epichlorohydrin rubber on a two roll laboratory mill. The compounding ingredients were incorporated by mill mixing for about 30 minutes. The compounded rubber was molded and cured at 345°F. for about 45 minutes and post cured in a circulating oven at 300°F. for about 3 hours. The cured rubber was cut into specimens of 1/16 × ½ × 1½ inches. The specimens were placed in a high pressure vessel and the vessel was filled with the test liquid, sealed, pressured to 4000 psi with nitrogen gas and placed in an oven at 275°F. for 7 days. In Table II, the percentage of volume change on exposure to different liquids is listed.

TABLE I

| Components | 1*<br>Parts | 2*<br>Parts | 3<br>Parts | 4<br>Parts | 5<br>Parts | 6<br>Parts | 7<br>Parts | 8<br>Parts |
| --- | --- | --- | --- | --- | --- | --- | --- | --- |
| | | | | Examples | | | | |
| Epichlorohydrin-Ethyleneoxide Copolymer | 100 | — | — | — | — | — | — | — |
| Epichlorohydrin Homopolymer | — | 100 | 100 | 100 | 100 | 100 | 100 | 100 |
| Nickel dibutyl dithiocarbamate | 1.0 | 1.0 | 2.0 | 2.0 | 1.0 | 1.0 | 1.0 | 1.0 |
| Basic Lead Phosphite | — | 20.0 | 15.0 | 15.0 | 10.0 | 10.0 | 10.0 | 10.0 |
| Red Lead | 7.5 | — | — | — | — | — | — | — |

TABLE I – Continued

| Components | Examples | | | | | | | |
|---|---|---|---|---|---|---|---|---|
| | 1* Parts | 2* Parts | 3 Parts | 4 Parts | 5 Parts | 6 Parts | 7 Parts | 8 Parts |
| Phenothiazine | 1.0 | — | 1.0 | 1.0 | 1.0 | 1.0 | 1.0 | 1.0 |
| Azelaic Acid | 4.0 | — | 6.0 | 6.0 | 4.0 | 4.0 | 4.0 | 4.0 |
| Copper dimethyl dithiocarbamate | .125 | — | .125 | 0.2 | — | .125 | .125 | .125 |
| Cadmium Diethyl dithiocarbamate | — | — | — | — | .125 | — | — | — |
| Imidazole KE(1) | 1.5 | 1.0 | 2.0 | 2.0 | 1.0 | 1.0 | 1.0 | 2.0 |
| Silica | — | — | 2.0 | 30 | 10 | 10 | 10 | 10 |
| HAF Black | — | — | 2.0 | 55 | 30 | 30 | 30 | 30 |
| MT Black | — | 125 | — | — | — | — | — | — |
| ISAF Carbon Black | 50 | — | — | — | — | — | — | — |
| Sorbitan Monostearate | 1.0 | — | 1.0 | 2.0 | 1.5 | 1.5 | 1.5 | 1.5 |
| Dibutoxy ethoxyethyl adipate | — | — | 0.5 | 2.0 | 1.0 | 7.5 | 1.0 | 1.0 |
| Polyethylene emulsion | — | 1.0 | 0.5 | 1.0 | 0.5 | 0.5 | 0.5 | 0.5 |
| Triethylene Glycol Dimethyl ether | 20.0 | — | — | — | — | — | — | — |

*Recommended Commercial Rubber Formulations (Prior Art)
(1)Imidazole KE is imidazole on type KE clay, supplied by Hercules Chemical Corporation.

TABLE II

| | % Volume Change on Exposure to Water, Brine and Oil - Seven Days at 275°F. and 4000 psi | | | | | | | |
|---|---|---|---|---|---|---|---|---|
| | 1 % | 2 % | 3 % | 4 % | 5 % | 6 % | 7 % | 8 % |
| Brine Exposure | −10.0 | 1.32 | 8.1 | −3.12 | 0.65 | −4.7 | −0.29 | 0.77 |
| Oil Exposure | −12.5 | 4.6 | 20.5 | −2.7 | 12.5 | −2.0 | −0.43 | −0.49 |

Examples 4, 5, 6, 7 and 8 are illustrative of the present invention. The test data shown in Table II indicate that the epichlorohydrin homopolymer rubbers compounded and cured in accordance with the instant invention are remarkably resistant to deterioration in the presence of oil and brine, even at elevated temperatures and extreme pressures. The compositions of Examples 1 and 2, it will be noted, are inferior with respect to sensitivity to brine. Example 3 contains insufficient filler which results in high volume swell in oil and in water. Further, in Examples 4–8 inclusive, i.e., those within the limits of the instant invention, are more resistant to volume change in oil and brine. In particular the optimum materials represented by examples 7 and 8 exhibit only very minor volume changes under these extreme conditions.

As the levels of fillers and processing aids are varied, sensitivity to brine and oil exposure is changed, as for example 4 with high filler loadings and example 6, with an increased level of processing aids. Although compositions exhibiting the least change in volume swell are preferred, formulations exhibiting somewhat greater sensitivity to these environments may find restricted application in less extreme environments and are included within the broadest scope of the instant invention.

The compositions of the instant invention are especially useful for gasketing, sealing and coating materials for use in applications such as cable jacketing, connectors, and casing sealants in oil well production equipment.

Though the invention has been described with respect to specific compounding ingredients for the epichlorohydrin rubber, it is well understood by those skilled in the art that the invention may be broader than specifically illustrated without departing from the spirit of the invention. The scope of the invention is defined by the claims which are appended hereto and made a part hereof.

I claim:

1. An epichlorohydrin homopolymer rubber composition capable of being cured and then capable of withstanding 4,000 psi pressure at 275°F. for at least 7 days with less than about 5% volume swell from brine exposure and less than about 5% volume change from oil exposure, said composition comprised of about 100 parts by weight of an epichlorohydrin homopolymer rubber having a molecular weight in excess of 200,000; about 1–2 parts by weight of nickel dibutyl dithiocarbamate; about 10–15 parts by weight of basic lead phosphite; about 1 part by weight phenothiazine; about 4–6 parts by weight of an aliphatic dicarboxylic acid; about 0.125 to 0.2 parts by weight of a dimethyl dithiocarbamate selected from the group consisting of copper dimethyl dithiocarbamate and cadmium diethyl dithiocarbamate; about 1–2 parts by weight of an imidazole; and from about 10 to about 50 parts by weight of a filler selected from the group consisting of silica and carbon black.

2. The composition of claim 1 wherein processing aids selected from the group consisting of sorbitan monostearate, dibutoxyethoxyethyl adipate and polyethylene emulsions are added in an amount of from about 1–10 parts by weight per 100 parts by weight of rubber.

3. An epichlorohydrin rubber composition containing 100 parts by weight epichlorohydrin homopolymer, about 1.0 part by weight nickel dibutyl dithiocarbamate, about 10 parts by weight basic lead phosphite; about 1.0 part by weight phenothiazine, about 4.0 parts by weight azelaic acid, about .125 parts by weight copper dimethyl dithiocarbamate, about 1.0 part by weight imidazole, about 10 parts by weight silica, about 30 parts by weight carbon black, about 1.5 parts by weight sorbitan monostearate, about 1.0 part by weight dibutoxy ethyoxyethyl adipate, about 0.5 part by weight polyethylene emulsion therein.

* * * * *